Patented Sept. 21, 1937

2,093,519

UNITED STATES PATENT OFFICE 2,093,519

PROCESS FOR THE MANUFACTURE OF CONDENSATION PRODUCTS OF CROTONALDEHYDE

Karl Hamann, Krefeld-Uerdingen, Germany, assignor to I. G. Farbenindustrie Aktiengesellschaft, Frankfort-on-the-Main, Germany No Drawing. Application April 9, 1936, Serial No. 73,593. In Germany April 25, 1935

4 Claims. (Cl. 260—99.30)

This invention relates to a process for the manufacture of compounds of the type of crotylidene cyanacetic acid.

In accordance with the present invention crotonaldehyde can be combined in a smooth reaction with cyanacetic acid to yield crotylidene cyanacetic acid or condensation products of this type.

The process of the invention comprises condensing crotonaldehyde with cyanacetic acid under such conditions that no substantial resinification takes place, i. e. in the presence of such an amount of an alkaline condensing agent that the reaction mixture exhibits a pH-value of about 10 to about 12 and a reaction temperature from about 0 to about 12° C. and especially from about 4 to about 8° C. Condensing for example crotonaldehyde and cyanacetic acid in aqueous solution in the presence of sodium hydroxide the amount of the base mentioned before should not exceed 2–3% calculated on the amount of cyanacetic acid to be condensed, the amount of the base employed in this case corresponding to a pH-value of 10–12 of the aqueous solution. When employing sodium hydroxide as a condensing agent the optimum results are obtained at a temperature of about 5° C.

According to the process of the present invention it is readily possible to obtain the condensation products in yields up to 90%.

As suitable alkaline condensing agents may be mentioned alkali metal hydroxides, for example sodium hydroxide, potassium hydroxide, lithium hydroxide, alkali metal carbonates, such as sodium carbonate and potassium carbonate, hydroxides of alkali earth metals, such as calcium hydroxide, strontium hydroxide, barium hydroxide, finally ammonia and organic bases, such as dimethyl amine, trimethyl amine, diethyl amine, piperidine and the like.

When employing organic solvents preferably those are used which do not undergo a chemical change under the reaction conditions, such as for example, alcohols, such as methyl alcohol, ethyl alcohol, glycol, furthermore glycol ethers etc.

The invention is illustrated, but not restricted by the following example; the parts being by weight:

*Example*

A solution of 90 parts by weight of cyanacetic acid in the form of the sodium salt in 600 parts of water, after the addition of 20 parts by weight of 10% aqueous caustic soda lye, is cooled to about 5° C. Then 74 parts by weight of crotonaldehyde are caused to drop into this solution in the course of about 10 minutes, precautions being taken by cooling to ensure that the temperature does not exceed 10° C. The reaction mixture obtained has a pH of 11–11,5. The mixture is stirred for a further 1½ hours at about 5° C. A portion of the nitrilic acid precipitates in the form of the sodium salt. When the reaction is complete this salt is brought into solution by heating the mixture for a short time up to 10° C. The nitrilic acid is then precipitated by the addition of 400 parts by weight of 10% sulfuric acid. The acid is obtained in a yield of 85%.

I claim:

1. Process which comprises reacting with crotonaldehyde upon cyanacetic acid in the presence of such an amount of an alkaline condensing agent which corresponding to a pH-value of the reaction mixture of about 10 to about 12 and at a reaction temperature from about 0 to about 12° C.

2. Process which comprises reacting with crotonaldehyde upon cyanacetic acid in the presence of such an amount of an aqueous solution of an alkaline condensing agent which corresponds to a pH-value of the reaction mixture of about 10 to about 12 and a reaction temperature from about 0 to about 12° C.

3. Process which comprises reacting with crotonaldehyde upon cyanacetic acid in the presence of such an amount of aqueous caustic soda lye which corresponds to a pH-value of the reaction mixture of about 10 to about 12 at a temperature of 5° C.

4. Process which comprises reacting with 74 parts by weight of crotonaldehyde upon a solution of 90 parts by weight of cyanacetic acid in the form of the sodium salt in 600 parts of water in the presence of 20 parts by weight of a 10% aqueous caustic soda lye at a temperature of 5° C.

KARL HAMANN.